(12) United States Patent
Doms

(10) Patent No.: US 11,763,073 B2
(45) Date of Patent: Sep. 19, 2023

(54) MULTI-DIMENSIONAL TABLE REPRODUCTION FROM IMAGE

(71) Applicant: SAP SE, Walldorf (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 117 days.

(21) Appl. No.: 17/408,127

(22) Filed: Aug. 20, 2021

(65) Prior Publication Data
US 2023/0057485 A1 Feb. 23, 2023

(51) Int. Cl.
*G06F 40/177* (2020.01)
*G06F 16/22* (2019.01)
*G06V 30/412* (2022.01)
*G06F 18/22* (2023.01)
*G06V 30/19* (2022.01)

(52) U.S. Cl.
CPC ........ *G06F 40/177* (2020.01); *G06F 16/2282* (2019.01); *G06F 18/22* (2023.01); *G06V 30/412* (2022.01); *G06V 30/19007* (2022.01)

(58) Field of Classification Search
None
See application file for complete search history.

(56) References Cited

U.S. PATENT DOCUMENTS

| | | | |
|---|---|---|---|
| 5,956,422 A | 9/1999 | Alam | |
| 7,934,151 B1* | 4/2011 | Castrucci | G06F 40/177 715/221 |
| 10,241,992 B1* | 3/2019 | Middendorf | G06F 40/177 |
| 11,257,049 B1* | 2/2022 | Durazo Almeida | G06V 30/413 |
| 11,500,840 B2* | 11/2022 | Gupta | G06F 18/22 |
| 2006/0235855 A1* | 10/2006 | Rousseau | G06F 16/48 |
| 2012/0131445 A1* | 5/2012 | Oyarzabal | G06F 40/103 715/235 |
| 2019/0139280 A1* | 5/2019 | Hubel | G06V 30/412 |
| 2019/0243643 A1* | 8/2019 | Bahrami | G06F 9/541 |
| 2019/0347503 A1* | 11/2019 | Kimura | G06V 30/414 |
| 2020/0073878 A1* | 3/2020 | Mukhopadhyay | G06F 16/93 |
| 2020/0097711 A1* | 3/2020 | Venkateswaran | G06V 30/413 |
| 2021/0216803 A1* | 7/2021 | Otaka | G06F 18/2185 |
| 2022/0067364 A1* | 3/2022 | Ramsl | G06N 3/045 |
| 2022/0121845 A1* | 4/2022 | Davidson | H04N 1/00037 |

(Continued)

*Primary Examiner* — Howard Cortes
(74) *Attorney, Agent, or Firm* — Fountainhead Law Group, P.C.

(57) ABSTRACT

Embodiments facilitate selection and assignment of a known user model, based upon input comprising table images of original data. A table engine receives the image and performs pre-processing (e.g., rasterization, Optical Character Recognition, coordinate representation) thereupon to identify image entities. After filtering original numerical data, a similarity (e.g., a distance) is calculated between an image entity and a dimension member of the known user model. Based upon this similarity, the table engine selects and assigns the known user model to the incoming tables images, generating a file representing table columns and rows. This file is received at the UI of an analytics platform, which in turn populates the model with data of the user (rather than the original data) via an API. Embodiments may be particularly valuable in allowing a user to rapidly generate multi-dimensional tables comprising their own data, based upon raw table images received from an external party.

20 Claims, 9 Drawing Sheets

(56) References Cited

U.S. PATENT DOCUMENTS

2022/0292293 A1\* 9/2022 Wang ................... G06V 10/25
2022/0318224 A1\* 10/2022 Thompson .......... G06F 16/2282
2022/0318545 A1\* 10/2022 Poff .................... G06V 30/412

\* cited by examiner

FIG. 1A

| Country | Address | Store | Product Group | Product | Quarter | Year | Date | Revenues |
|---|---|---|---|---|---|---|---|---|
| Germany | D-69117 | Heidelberg | dishes | cup | Q1 | 2011 | 1.2011 | 3€ |
| Germany | D-10115 | Berlin | decoration | candle | Q2 | 2011 | 4.2011 | 1€ |
| Germany | D-69117 | Heidelberg | dishes | plate | Q2 | 2011 | 5.2011 | 3€ |
| Germany | D-70173 | Stuttgart | furniture | tablecloth | Q2 | 2011 | 5.2011 | 10€ |
| Germany | D-69117 | Heidelberg | dishes | cup | Q3 | 2011 | 7.2010 | 3€ |
| France | F-75001 | Paris | furniture | lamp | Q1 | 2012 | 2.2012 | 15€ |
| Spain | ES-28001 | Madrid | decoration | napkin | Q3 | 2012 | 8.2012 | 3€ |
| Spain | ES-28001 | Madrid | dishes | cup | Q3 | 2012 | 7.2012 | 2€ |
| Germany | D-69117 | Heidelberg | decoration | napkin | Q4 | 2012 | 12.2012 | 3€ |

| | Program services | | Supporting services | | Total |
|---|---|---|---|---|---|
| | Women and children | Men | Management and general | Fundraising | |
| Compensation | 77,529 | 73,683 | 38,971 | 8,857 | 199,040 |
| Depreciation | 20,644 | — | 2,534 | 634 | 23,812 |
| Food | 3,039 | 76 | — | — | 3,115 |
| Insurance | 1,295 | 515 | — | — | 1,810 |
| Interest | — | — | 4,038 | — | 4,038 |
| Maintenance of equipment | 324 | — | 733 | — | 1,057 |
| Occupancy | 10,964 | 1,715 | 975 | 243 | 13,897 |
| Maintenance | 3,449 | 938 | 371 | 24 | 4,782 |
| Rent | — | 8,388 | — | — | 8,388 |
| Postage | 68 | 39 | 997 | 996 | 2,100 |
| Printing | 434 | 138 | 968 | 1,450 | 2,990 |
| Supplies | 3,271 | 2,243 | — | — | 5,514 |
| Telephone | 2,293 | 874 | 581 | 387 | 4,135 |
| Other | 24 | — | 220 | 57 | 301 |
| | $123,334 | $88,608 | $50,388 | $12,648 | $274,979 |

FIG. 1C

|  | Program Services | | Support Services | Total Expenses |
| --- | --- | --- | --- | --- |
|  | Early Education | Higher Education | | |
| Wages | 2,128,801 | 1,549,654 | 678,053 | 4,356,508 |
| Fringe benefits | 808,944 | 588,869 | 257,660 | 1,655,473 |
| Consultants | 144,096 | 43,158 | 38,869 | 226,123 |
| Rent | 38,262 | 27,220 | 89,873 | 155,355 |
| Office Supplies and Expenses | 45,314 | 20,118 | 48,212 | 113,644 |
| Postage and Shipping | 71,668 | 7,684 | 25,132 | 104,484 |
| Legal Fees | 50,061 | 32,487 | 4,582 | 87,130 |
| Accounting Fees | 4,352 | 3,487 | 55,782 | 63,621 |
| Telephone and Internet | 10,654 | 44,188 | 6,542 | 61,384 |
| Insurance | 439 | 215 | 50,354 | 51,008 |
| Bank Fees | 2,685 | 2,187 | 22,487 | 27,359 |
| Printing and Publications | 13,331 | 11,187 | 2,154 | 26,672 |
| Dues and Membership | 6,597 | 788 | 1,872 | 9,237 |
| TOTAL | $3,325,204 | $2,331,222 | $1,281,572 | $6,937,998 |

|  | A | B | C | D | E | F |
| --- | --- | --- | --- | --- | --- | --- |
| 1 |  |  | Jan | Feb | Mar | April |
| 2 | Revenue | | | | | |
| 3 |  | Subscription Software Revenue | $350,000 | $360,000 | $385,000 | $370,000 |
| 4 |  | Professional Services | $ 40,000 | $ 35,000 | $ 20,000 | $ 55,000 |
| 5 | Total Revenue | | $390,000 | $395,000 | $405,000 | $425,000 |
| 6 | | | | | | |
| 7 | Cost of Goods | | | | | |
| 8 |  | Third Party and/or Transaction Fees | $ 3,500 | $ 3,600 | $ 3,850 | $ 3,700 |
| 9 |  | Hosting Expenses | $ 8,750 | $ 9,000 | $ 9,625 | $ 9,250 |
| 10 |  | Customer Support | $ 12,300 | $ 14,000 | $ 14,500 | $ 13,000 |
| 11 |  | Internal Engineering Support | $ 4,100 | $ 4,300 | $ 4,000 | $ 3,900 |
| 12 |  | Professional Services | $ 32,000 | $ 30,000 | $ 35,000 | $ 33,000 |
| 13 | Total CoGS | | $ 60,650 | $ 60,900 | $ 66,975 | $ 62,850 |
| 14 | Gross Profit | | $329,350 | $334,100 | $338,025 | $362,150 |
| 15 | Gross Margin | | 84% | 85% | 83% | 85% |
| 16 | | | | | | |
| 17 | Operating Expenses | | | | | |
| 18 |  | Sales | $145,000 | $125,000 | $122,000 | $135,000 |
| 19 |  | Marketing | $ 87,000 | $ 62,000 | $ 89,000 | $ 79,000 |
| 20 |  | Product Development | $135,000 | $130,000 | $128,000 | $133,000 |
| 21 |  | General and Administrative | $ 56,000 | $ 71,000 | $ 73,000 | $ 81,000 |
| 22 | Total Operating Expenses | | $423,000 | $388,000 | $412,000 | $428,000 |
| 23 | | | | | | |
| 24 | Net Income | | $ (93,650) | $ (53,900) | $ (73,975) | $ (65,850) |
| 25 | | | | | | |
| 26 | | | | | | |

SaaS Income Statement

MULTI-DIMENSIONAL TABLE REPRODUCTION FROM IMAGE

BACKGROUND

Unless otherwise indicated herein, the approaches described in this section are not prior art to the claims in this application and are not admitted to be prior art by inclusion in this section.

The representation of data in tabular form can be useful for visualizing and modifying complex data sets. In particular, such tables can effectively represent related data across multiple dimensions.

However the importation of (e.g., voluminous, unformatted) raw data into multi-dimensional table form, can be a time-consuming and error prone process. That is, a user will generally need to perform a number of manual interactions with an interface to create an accurate layout of data in multi-dimensional table format.

SUMMARY

Embodiments facilitate the automatic selection and assignment of a known user model, based upon an input comprising an image of a table including original data. A table engine receives the image and performs pre-processing (e.g., rasterization, Optical Character Recognition, coordinate representation) thereupon to identify image entities. After filtering out original numerical data of the image, a similarity (e.g., a distance) is calculated between an image entity (e.g., a word) and a dimension member of the known user model. Based upon this similarity, the table engine selects and assigns the known user model to the incoming table images, generating a file representing table columns and rows. This file is received at the UI of an analytics platform, which in turn populates the model with data of the user (rather than the original data) via an API of the analytics platform. Embodiments may be particularly valuable in allowing a user to rapidly generate multi-dimensional tables of their own data based upon raw table images received from an external party (e.g., presenter, due diligence subject).

The following detailed description and accompanying drawings provide a better understanding of the nature and advantages of various embodiments.

BRIEF DESCRIPTION OF THE DRAWINGS

FIGS. 1A-D shows examples of table images that may be received as input.

FIG. 4B shows an example of a table constructed according to an embodiment from the input image of FIG. 3.

DETAILED DESCRIPTION

Described herein are methods and apparatuses that implement the reproduction of multi-dimensional tables. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
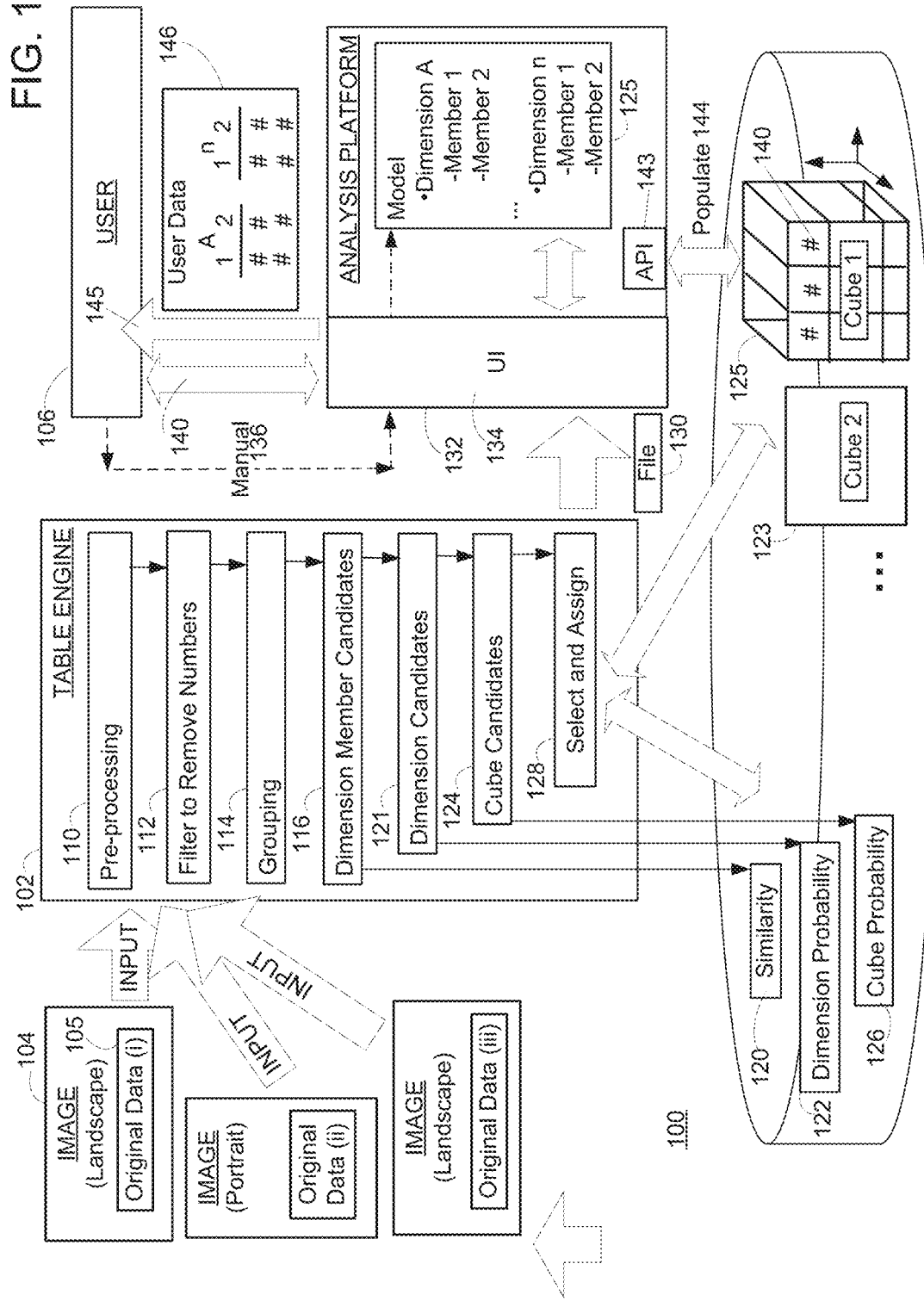
FIG. 1 shows a simplified diagram of a system according to an embodiment.

FIG. 1 shows a simplified view of an example system that is configured to implement table reproduction according to an embodiment. Specifically, system 100 comprises a table engine 102 that is configured to receive one or more images 104 as input.

These images include original data 105. However, as described below this original data is eventually filtered and is not ultimately referenced in creating the output.

These images depict table(s) and their original data, arranged in rows and columns. The table engine functions to create from these inputs, multi-dimensional tables matching existing data cubes (e.g., 123, 125) of relevance to a user 106.

A cube is a model with several dimensions. Each dimension typically has several members with names, descriptions, and synonyms.

In particular, the table engine performs a number of processing phases on the incoming image data. An initial, pre-processing phase 110 may comprise one or more of the following.

1. Rasterizing the input image for conversion into pixels.
2. Determining an orientation (e.g., portrait, landscape) of the input image. This determination may allow for manual correction by a user.
3. Perform Optical Character Recognition (OCR) techniques to identify sequences of characters visible in the incoming images.
4. Establish coordinates of characters within the image. Minimum and maximum coordinates (e.g., corresponding to margins) may be set for x and y. Detected strings may be characterized by their coordinates.

FIGS. 1A-D show examples of table images that may be received as input. OCR techniques may identify sequences of characters visible in the incoming images. Such characters may comprise strings that include but are not limited to the following.

Dimension names. Examples from the sample input image of FIG. 1A are:
  "Country"
  "Address"
  "Store"
  "Product Group"
  "Product"
  "Quarter"
  "Year"
  "Date"

Dimension member names. Examples member names from the image of FIG. 1A include:
  "Germany"
  "France"
  "Spain"
  "cup"
  "candle"
  "plate"

Hierarchical dimension member names. Examples of such names in FIG. 1B include:
"Program services",
"Men"
"Women and children"
"Supporting services"
"Management and general"
"Fundraising"
Names of measures, accounts and calculations. Examples include:
"Rent" (FIG. 1B)
"Revenue" (FIG. 1C)
"Total Operating Expenses" (FIG. 1C)

In a next phase 112, the identified strings are then filtered to remove strings comprising numbers only. This is performed because such numbers typically correspond to data of the original table (rather than headers of the original table). As discussed below, ultimately that original table data will be replaced with data from the user's own model.

In a next phase 114, groups of words may be determined. This grouping may be based upon proximity (words appearing next to and below each other). Coordinate locations of words and word groups may be determined.

Then, in phase 116 a catalog of dimension member candidates is constructed from word groups/single words. Groups of dimension member candidates may have a similar alignment (x or y coordinate) when mapped to the x or y axis.

For each dimension member candidate a score of a similarity measure 120 is calculated with dimension members that are already known from established dimensions of existing models known to the user. As described herein, string similarity measures may be applied.

The most similar string found in the metadata may be used for the mapping of an image entity to a corresponding dimension in an existing model of the user. Examples of similarity measures may include but are not limited to the following.
Edit distance;
B ag of words and string kernels;
Euclidean distance;
Levenshtein, Manhattan distance;
Minkowski distance;
Jaccard Similarity;
Cosine Similarity.

For each string mapped to a known metadata string, the relative location in the image can be considered. Based upon the location in the image, entities (e.g., words, word groups) are mapped to one of the two axes "rows" and "columns".

For example in the image of FIG. 1D, the entities:
"Program Services",
"Early Education",
"Higher Education",
"Support Services", and
"Total Expenses"
are mapped to the "columns" axis. In FIG. 1D, the entities:
"Wages",
"Fringe benefits", and
"Rent"
are mapped to the "rows" axis.

For each entity, two orderings are recorded that indicate top-down and left-right precedence also taken from the image. In the example of FIG. 1D:
'Wages',
'Fringe benefits', and
'Rent'
are ordered top-down in that order.

Another example is 'Program Services' in FIG. 1C, which has a precedence of type top-down with respect to 'Early Education' and 'Higher Education'. This is because the two terms have a lower y-coordinate in the image of FIG. 1C. In the particular example of FIG. 1C, there may be no precedence of type left-right among the items.

In the next phase 121, for each known dimension of the existing user models, calculate a probability 122 of membership for each candidate. That probability is stored in the underlying storage layer.

Next, in the phase 124, based upon comparison of identified entities of the image with one or more existing models, a cube probability is calculated. That is, for each known user cube 123, 125, a probability 126 based on dimension and member candidates is determined and stored.

In the phase 128, the cube with the highest probability is selected and assigned. This phase may allow for manual correction by the user.

If more than one model has the same comparison signature, other heuristics may be applied for purposes of selection. Example heuristics can include but are not limited to:
the most frequently used model; and
the most recently used model.

If several models match, the user may be offered with a manual choice. This can be presented in the form of a selection dialog to choose from.

Dimensions within the selected cube may be selected and assigned (e.g., by maximizing an overall probability for all candidates). Each dimension can only be assigned once, and manual correction by the user may again be provided for.

For each axis in the image, it is decided which dimensions are configured. Directly matching dimension names may afford the strongest indication as a first priority.

As a second priority, strings with a high similarity or synonyms can be mapped. Synonyms may come from the model metadata or dimension metadata. Dictionaries may be used to map entities identified in the image to dimension names existing in the models.

OCR errors may be tolerated when the entities exhibit sufficient similarity to metadata information.

Dimension members may be selected and assigned based on the similarity measures calculated above. Again, this can be overridden by manual user correction.

Next, the selected cube with the assigned dimensions/dimension members is communicated as a file 130 to an analysis platform 132. The file is of a format expected by the user interface 134 of the analysis platform. That is, a format conforming to input 136 by which the analysis platform manually receives a designated table structure from the user.

Then, based upon interaction 140 between the user and the analysis platform, the platform can access the underlying data 142 via that application programming interface (API) 143, and populate 144 the selected and assigned model/dimensions/dimension members.

As a result, in FIG. 1, a user will see as output 145 from the analysis platform's UI, a similarly configured table 146 containing the values derived from the underlaying model (rather than from the input image).

Numeric figures may be connected with measures, accounts, or calculated figures. No assumption may be made concerning the actual numeric values in the table. Rather, values are taken from the selected model and calculations are displayed based upon the underlying formulas and fact values.

Figure 2:
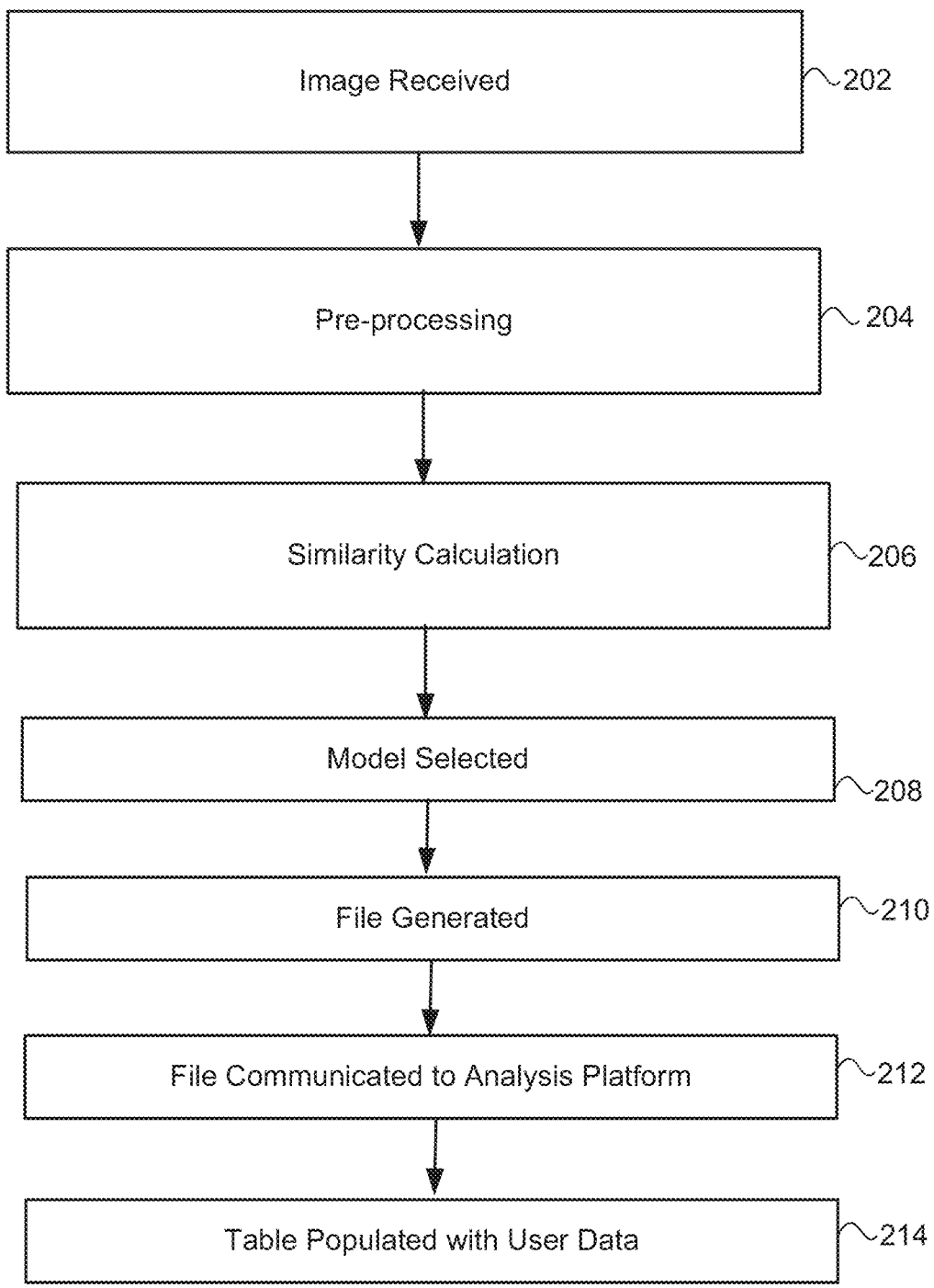
FIG. 2 shows a simplified flow diagram of a method according to an embodiment.

FIG. 2 is a flow diagram of a method 200 according to an embodiment. At 202, an image of a table is received.

At 204, the image is subjected to pre-processing to identify image entities. At 206, a similarity is calculated between a text image entity and a dimension member of a model.

At 208, the model is selected based upon the similarity. At 210, a file is generated representing the model as a table including the dimension member.

At 212, the file is communicated to an interface of a data analysis platform. At 214, the analysis platform populates the table with data stored in a database.

Systems and methods according to embodiments, may avoid one or more issues that may be associated with table reproduction. In particular, the utilization of embodiments may avoid extensive, error-prone manual effort that is otherwise required to reproduce a table from a raw input.

Further details regarding table reproduction according to various embodiments, are now provided in connection with the following example.

Example

Figure 3:
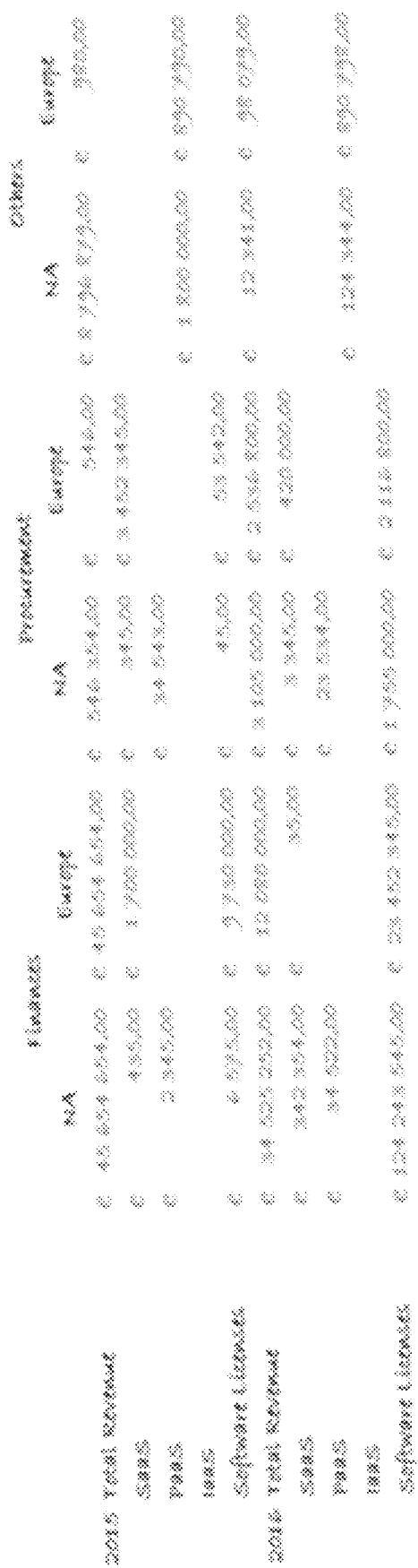
FIG. 3 shows one example of an image of a table provided as input according to an embodiment.

The system of this exemplary embodiment relates to the reproduction of multi-dimensional tables within the SAP Analytic Cloud platform available from SAP SE, of Walldorf, Germany. In particular, FIG. 3 shows an image of one table that is input. Here, the image is of a table representing revenue over the years 2015 and 2016.

This image may be obtained, for example from a scan or a photograph. Here, the image has a number of characteristics that may complicate its processing.

For example the image of FIG. 3 is skewed, and does not align precisely with the horizontal or vertical edges. Also, the image of FIG. 3 includes an unusual font that is both ornate and colored.

An example flow of a process of determining the dimension members, dimensions, and cube from a raw image according to an embodiment, is as follows.

1. Rasterize image received as input. (conversion into pixels)
2. Determine the orientation (e.g., portrait, landscape) of the image. This determination may allow for manual correction by a user.
3. Perform OCR to detect strings and their relative coordinates. Minimum and maximum coordinates (e.g., corresponding to margins) may be set for x and y.
4. Remove strings comprising numbers only. This is because such numbers typically correspond to table data (rather than table headers), and such original will ultimately be replaced with data from the user's own model.
5. Determine groups of words. This grouping may be based upon proximity (words next to and below each other).
6. Determine coordinates of word groups and single words.
7. Build catalog of dimension member candidates from word groups/single words.
8. Determine groups of dimension member candidates with similar alignment (x or y coordinate).
9. Map groups of dimension member candidates to x or y axis.
10. For each dimension member candidate, calculate a score of a similarity measure with dimension members already known from established dimensions of existing models.

Examples of similarity measures may include but are not limited to the following.
Edit distance;
Bag of words and string kernels;
Euclidean distance;
Levenshtein, Manhattan distance;
Minkowski distance;
Jaccard Similarity;
Cosine Similarity.

11. For each known dimension, calculate a probability for each candidate membership.
12. For each cube, calculate a probability based on dimension and member candidates
13. Select and assign the cube with the highest probability, allowing for manual correction by the user.
14. Select and assign the dimensions within the selected cube (by maximizing the overall probability for all candidates). Each dimension can only be assigned once, and manual correction by the user may be provided for.
15. Select and assign dimension members based on the similarity measures calculated above. Again, this can be overridden by manual user correction.
16. Determine the order of dimension for each axis. As an example, this can be: y-axis left-right, x-axis top-bottom coordinates.

Once the cube, dimensions, and members have been determined from a raw image as described above, the table representation can now be configured. An example flow for a process of configuring the table representation is as follows.

Figure 4A:
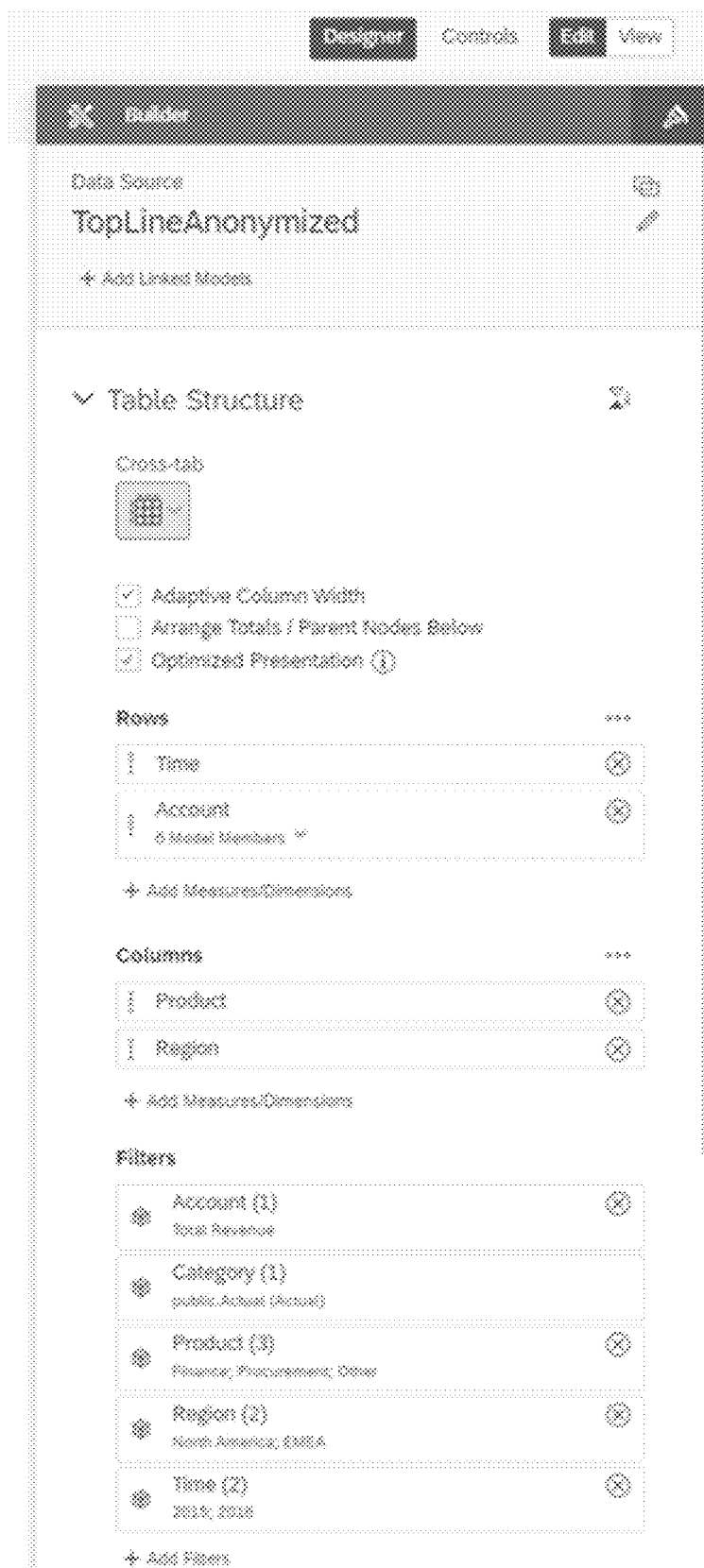
FIG. 4A shows an example of a menu offered by an interface for manually creating a table.

A. First, a table is configured in a particular context for the purposes of the user. In SAP Analytics Cloud this context is referred to as a "Story". The corresponding existing SAP Analytics Cloud dashboard in FIG. 4A allows assigning selected dimensions to an axis (row, column), and setting the order of display (e.g., left-right; top-bottom) of the selected dimensions along the axis.

B. Second, the members for each dimension are filtered. The result of this filtering shows only those having a candidate resulting from the process flow 1.-16. described above.

C. Establish an order of members shown in the table that is to be displayed to the user. This order is determined by the corresponding coordinates of the members from the process flow of 1.-16. above.

Figure 4B:
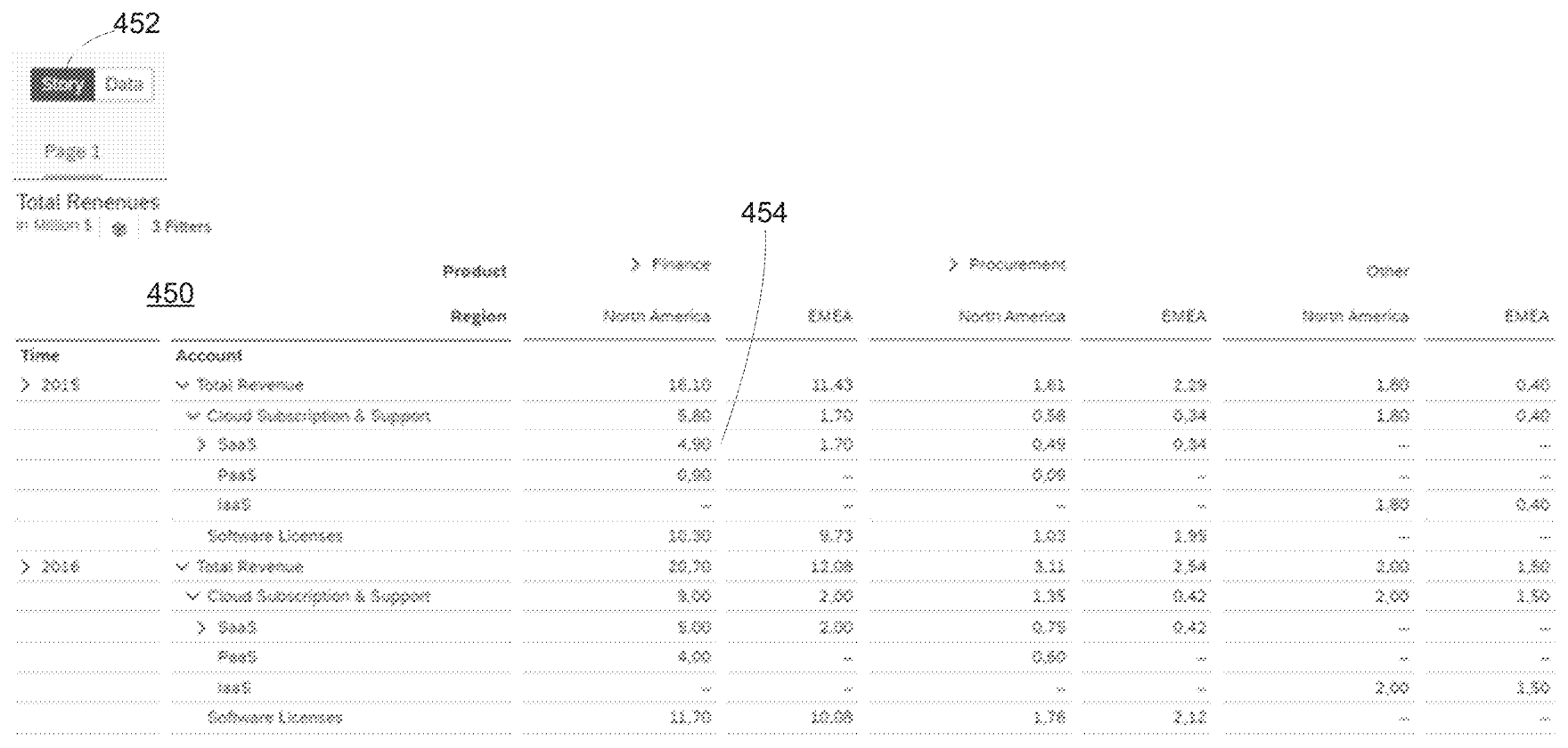

FIG. 4B shows the resulting configured table 450 for the corresponding SAP Analytics Cloud "Story" 452. Note particularly that the values of this table are taken from the selected model of the user, rather than from the original input image. Thus FIG. 4B shows year 2015 revenue attributable to SaaS in North America, as being "4.9" rather than "e 435.00" (as in the original data in FIG. 3).

It may be the case that no dimension names are identified in the images directly. Accordingly, some embodiments may infer dimension names. This can be done by selecting those dimensions which contain most of the dimension member names.

For example, a model may not include a dimension: 'Country'. However, that model may comprise a dimension: 'Origin' containing one or more dimension members (e.g., 'Germany', 'France', 'Spain"). Then, embodiments may infer that the 'Origin' dimension should be placed on one of the axes.

If more than one dimension is mapped to one of the axes 'rows' and 'columns', the order may be established according to left-right precedence of the entities (for the 'rows' axis), and top-down precedence (for the 'columns' axis).

If a dimension contains other members than are found in the image, then those may be filtered out. For example, if the dimension 'Origin' contains other countries (e.g., in addition to 'Germany', 'France', and/or 'Spain') as well, those are filtered out from the preconfigured table.

Returning now to FIG. 1, there the particular embodiment is depicted with the engine responsible for table reproduction as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 5:
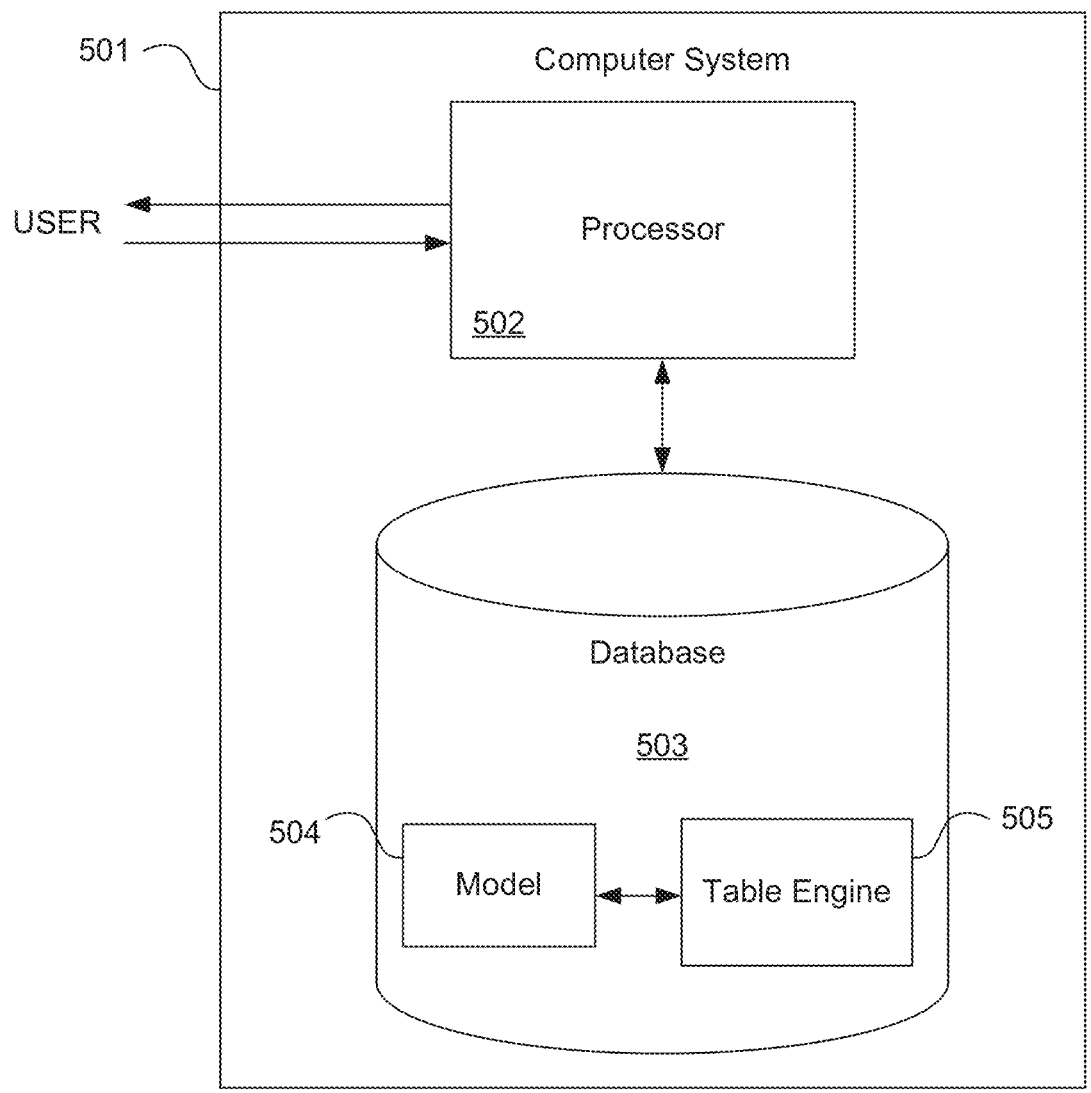
FIG. 5 illustrates hardware of a special purpose computing machine configured to implement table reproduction according to an embodiment.

Thus FIG. 5 illustrates hardware of a special purpose computing machine configured to implement table reproduction according to an embodiment. In particular, computer system 501 comprises a processor 502 that is in electronic communication with a non-transitory computer-readable storage medium comprising a database 503. This computer-readable storage medium has stored thereon code 505 corresponding to a table engine. Code 504 corresponds to a model. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
receiving an image;
pre-processing the image to identify a first image entity comprising a first word;
calculating a similarity between the first word and a dimension member of a model;
selecting the model based upon the similarity;
generating a file representing the model as a table including the dimension member; and
communicating the file to a user interface of a data analysis platform, such that the data analysis platform populates the table with data stored in a database.

Example 2. The computer implemented system and method of Example 1 wherein the pre-processing further identifies a second image entity comprising a number, the method further comprising filtering the second image entity.

Example 3. The computer implemented system and method of Example 1 wherein the pre-processing further identifies a second entity comprising a second word; and selecting the model is based upon similarity between the second word and the dimension member of the model.

Example 4. The computer implemented system and method of Examples 1, 2, or 3 wherein selecting the cube is based upon a first probability between the first image entity and a dimension of the model.

Example 5. The computer implemented system and method of Examples 1, 2, 3, or 4 wherein the pre-processing comprises one or more of:
rasterizing the image;
performing Optical Character Recognition (OCR) of the image; and
determining a coordinate location of the first image entity in the image.

Example 6. The computer implemented system and method of Examples 1, 2, 3, 4, or 5 wherein the similarity comprises a distance.

Example 7. The computer implemented system and method of Examples 1, 2, 3, 4, 5, or 6 wherein a format of the file identifies a column of the table and a row of the table.

Example 8. The computer implemented system and method of Examples 1, 2, 3, 4, 5, 6, or 7 wherein:
the database comprises an in-memory database;
an in-memory database engine of the in-memory database calculates the similarity; and
the in-memory database engine selects the model.

Figure 6:
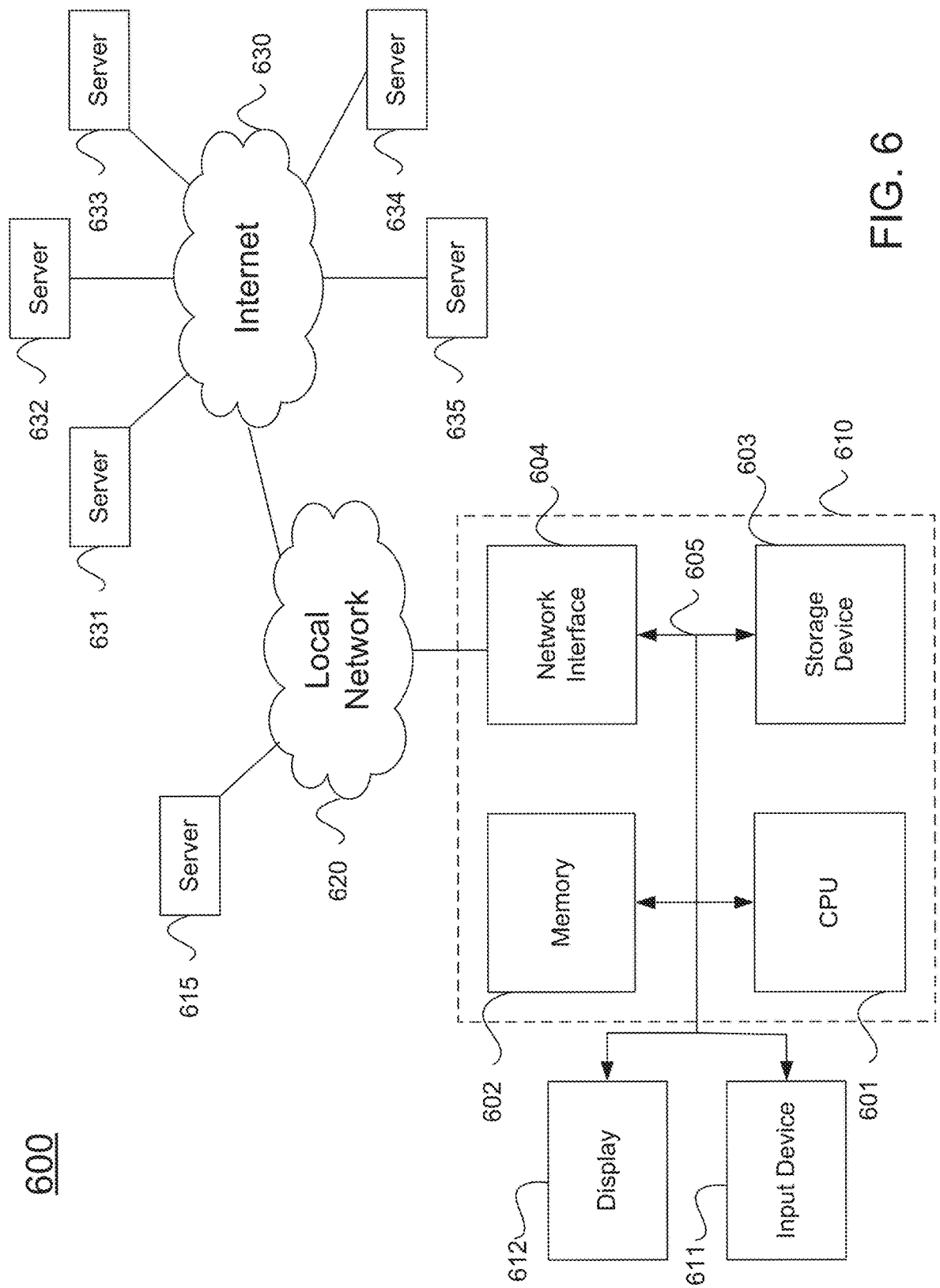
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable media.

Computer system 610 may be coupled via bus 605 to a display 612, such as a Light Emitting Diode (LED) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving an image;
pre-processing the image to identify a first image entity comprising a first word;
calculating a similarity between the first word and a dimension member of a model;
selecting the model based upon the similarity;
generating a file representing the model as a table including the dimension member; and
communicating the file to a user interface of a data analysis platform, such that the data analysis platform populates the table with data stored in a database,
wherein the model is a cube, and wherein selecting the cube is based upon a first probability between the first image entity and a dimension of the cube.

2. A method as in claim 1 wherein the pre-processing comprises one or more of:
rasterizing the image;
performing Optical Character Recognition (OCR) of the image; and
determining a coordinate location of the first image entity in the image.

3. A method as in claim 1 wherein the pre-processing further identifies a second image entity comprising a number, the method further comprising:
filtering the second image entity.

4. A method as in claim 1 wherein:
the pre-processing further identifies a second entity comprising a second word; and
selecting the model is based upon similarity between the second word and the dimension member of the model.

5. A method as in claim 1 wherein a format of the file identifies a column of the table and a row of the table.

6. A method as in claim 1 wherein selecting the cube is based upon a second probability between the dimension member and the dimension.

7. A method as in claim 1 wherein:
the database comprises an in-memory database;
an in-memory database engine of the in-memory database calculates the similarity; and
the in-memory database engine selects the model.

8. A method as in claim 7 wherein the model is stored in the in-memory database.

9. A method as in claim 1 wherein the similarity comprises a distance.

10. A method as in claim 1 wherein the data analysis platform populating the table with data is further based on an interaction between a user of the data analysis platform and the data analysis platform.

11. A non-transitory computer readable storage medium embodying a computer program for performing a method, said method comprising:
receiving an image;
pre-processing the image to identify a first image entity comprising a first word and a second image entity comprising a number;
filtering the number;
calculating a similarity between the first word and a dimension member of a model;
selecting the model based upon the similarity;
generating a file representing the model as a table including the dimension member; and
communicating the file to a user interface of a data analysis platform, such that the data analysis platform populates the table with data stored in a database,
wherein the model is a cube, and wherein selecting the cube is based upon a first probability between the first image entity and a dimension of the cube.

12. A non-transitory computer readable storage medium as in claim 11 wherein the pre-processing comprises at least one of:
rasterizing the image;
performing Optical Character Recognition (OCR) of the image; and
determining a coordinate location of the first image entity in the image.

13. A non-transitory computer readable storage medium as in claim 11 wherein:
the pre-processing further identifies a second entity comprising a second word; and
selecting the model is based upon similarity between the second word and the dimension member of the model.

14. A non-transitory computer readable storage medium as in claim 11 wherein the similarity comprises a distance.

15. A non-transitory computer readable storage medium as in claim 11 wherein the data analysis platform populating the table with data is further based on an interaction between a user of the data analysis platform and the data analysis platform.

16. A computer system comprising:
one or more processors;
a software program, executable on said computer system, the software program configured to cause an in-memory database engine of an in-memory database to:
receive an image;
pre-process the image to identify a first image entity comprising a first word;
calculate a similarity between the first word and a dimension member of a model stored in the in-memory database;
store the similarity in the in-memory database;
select the model based upon the similarity;
generate a file representing the model as a table including the dimension member;
store the file in the in-memory database; and
communicate the file to a user interface of a data analysis platform, such that the data analysis platform populates the table with data stored in the in-memory database, wherein the model is a cube, and wherein selecting the cube is based upon a first probability between the first image entity and a dimension of the cube.

17. A computer system as in claim 16 wherein the in-memory database engine is configured to pre-process the image by one or more of:
   rasterizing the image;
   performing Optical Character Recognition (OCR) of the image; and
   determining a coordinate location of the first image entity in the image.

18. A computer system as in claim 16 wherein the pre-processing further identifies a second image entity comprising a number, the in-memory database engine further configured to:
   filter the second image entity.

19. A computer system as in claim 16 wherein pre-processing further identifies a second entity comprising a second word; and
   the in-memory database engine is configured to select the model based upon similarity between the second word and the dimension member of the model.

20. A computer system as in claim 16 wherein the similarity comprises a distance.

* * * * *